United States Patent [19]

Nishii et al.

[11] 4,409,460
[45] Oct. 11, 1983

[54] METHOD OF MANUFACTURING A VACUUM BOOSTER HOUSING

[75] Inventors: Michiharu Nishii, Chiryu; Atsushi Ohmi, Anjo, both of Japan

[73] Assignee: Aisin Seiki Kabushiki Kaisha, Kariya, Japan

[21] Appl. No.: 330,503

[22] Filed: Dec. 14, 1981

[51] Int. Cl.$^3$ .......................................... B23K 11/14
[52] U.S. Cl. ................................... 219/93; 228/140; 228/190; 411/171
[58] Field of Search ................. 228/140, 190; 219/93, 219/94; 411/171

[56] References Cited

U.S. PATENT DOCUMENTS

| | | | |
|---|---|---|---|
| 1,190,208 | 7/1916 | Williams | 219/94 |
| 2,321,201 | 6/1943 | Heilman | 219/93 X |
| 2,903,562 | 9/1959 | Emmons et al. | 219/93 X |
| 3,020,987 | 2/1962 | Schavrte | 228/140 X |

FOREIGN PATENT DOCUMENTS 55-48547  3/1980  Japan .
55-76755  5/1980  Japan .

*Primary Examiner*—Kenneth J. Ramsey
*Attorney, Agent, or Firm*—Finnegan, Henderson, Farabow, Garrett & Dunner

[57] ABSTRACT

An improved method of manufacturing a vacuum booster housing for use in a brake system of an automotive vehicle where the brake master cylinder is secured to an annular wall portion of the body of the booster housing by means of bolts passing through holes in the annular wall portion. The method comprises forming annular projections on the seating faces of the heads of the bolts coaxial with the bolt shafts and on the inside surfaces of the annular wall portion coaxial with the holes, disposing a reinforcing plate between and in contact with the annular projections, and simultaneously projection welding the reinforcing plate to the inside surface of the annular wall portion and the seating face of the bolt head to the reinforcing plate.

3 Claims, 3 Drawing Figures

METHOD OF MANUFACTURING A VACUUM BOOSTER HOUSING

BACKGROUND OF THE INVENTION

1. Field of the Invention

The present invention relates to a vacuum booster for use in a brake system of an automotive vehicle. More particularly, the present invention is directed to a method of manufacturing a vacuum booster housing including an annular plate for reinforcing the portion of the wall of the body of the housing to which the brake master cylinder is secured as generally disclosed in co-pending, commonly assigned, U.S. patent applications, Ser. Nos. 306,738 and 306,739, both filed Sept. 29, 1981.

2. Description of the Prior Art

Conventional vacuum boosters for use in brake systems of automotive vehicles include a housing comprising a shaped, sheet metal body and a cooperating shaped sheet metal cover secured together to form a vacuum chamber. The vacuum booster housing is secured to the vehicle by means of bolts through holes in the cover. The brake master cylinder is secured to the housing by means of bolts through the body.

In conventional installation, the brake master cylinder is attached to an annular wall portion of the body of the booster housing by a plurality of bolts disposed in spaced holes in the annular wall portion with the head of the bolts inside the housing and the threaded, shaft portion of the bolts passing through the holes to the outside of the housing. Nuts secure the brake master cylinder to the shaft portions of the bolts extending outside of the housing.

The annular wall portion of the body to which the brake master cylinder is secured is subjected to the substantial load applied to the master cylinder from the booster. The body of conventional booster housings, therefore, have conventionally been manufactured of thicker sheet metal material to give the annular wall portion to which the master cylinder is attached sufficient strength to withstand the load.

Recently, in order to improve the fuel economy of automotive vehicles, efforts have been made to reduce the weight of the components of such vehicles. A significant weight saving may be achieved by reducing the thickness of the sheet metal material used to form the body portion of the booster housing.

Accordingly, it has been proposed to provide an annular reinforcing plate interposed between the inner surface of the annular wall portion of the body and the seating faces of the head portions from the bolts to which the master cylinder is secured to provide sufficient strength for withstanding the loads imposed on the master cylinder without using thicker sheet metal material to form the body. Co-pending, commonly assigned, U.S. patent application Ser. Nos. 306,738 and 306,739, both filed on Sept. 29, 1981, are directed to booster housings incorporating such annular reinforcing plates.

The installation of a reinforcing plate within the booster housing increases the complexity of the manufacturing process. One known method for manufacturing a booster housing with a reinforcing plate is to secure the bolts to the reinforcing plate and then, in a second step, weld the reinforcing plate to the annular wall portion of the booster housing to which the master cylinder is secured. These additional steps increase the manufacturing costs of the booster housing and, therefore, the overall vehicle.

Another known method of installing a reinforcing plate in a booster housing, as shown in FIG. 1, requires forming the seating face of the head portion 1a of bolt 1 with an annular projection 1b coaxial with the shaft portion 1c. In this method, the seating face of the head portion 1a having the annular projection 1b is disposed in holes in the reinforcing plate 3 and the head portion 1a of bolt 1 is electrically insulated from contact with reinforcing plate 3 by a layer of electrical insulation 2. The bolt 1 is then projection welded to the body 4 such that shaft portions 1c project through holes 4a in body 4, and the seating face of the head portion 1a is secured to the inner surface of the body 4. This known method increases the manufacturing cost by requiring the step of applying the insulation layer 2 to the inside face of the reinforcing plate so as to permit projection welding of the seating face of the head portion 1a to the inner surface of body 4. Furthermore, in this method the reinforcing plate 3 is not directly secured to either the body 4 or the head portion 1a of the bolt 1 presenting the possibility that the reinforcing plate may become loose and rattle.

The present invention provides a method for manufacturing a booster housing incorporating an annular reinforcing plate wherein the reinforcing plate is secured to and between the annular wall portion of the body and the seating face of the head of the bolt in a one-step operation. The one-step operation substantially reduces the cost of manufacturing of the booster housing, and the secured attachment of the reinforcing plate to both the annular wall portion and the seating face of the bolt head provides additional security against displacement of the reinforcing plate.

SUMMARY OF THE INVENTION

In accordance with the purpose of the invention, as embodied and broadly described herein, the method of manufacturing a vacuum booster housing including a body of sheet meal having an annular wall portion, a plurality of bolt disposed in a plurality of spaced holes in said annular wall portion with the heads of the bolts being inside the body and the shaft of the bolts projecting through the holes for securing a brake master cylinder to the booster housing, and an annular reinforcing plate interposed between and in contact with the inner surfaces of the annular wall portion and the seating faces of the heads of the bolts, comprising the steps of forming on the seating face of the head of each bolt an annular projection coaxial with the shaft thereof, forming on the inner surface of the annular wall portion annular projections, each annular projection being coaxial with a respective one of the holes, placing the reinforcing plate between and in contact with the annular projections on the bolts and on the inner surface of the annular wall portion, and simultaneously projection welding the annular wall portion to the reinforcing plate and the reinforcing plate to the head of the bolts.

Preferably, the method of forming the annular projection on the seating face of the heads of each bolt comprises stamp forging the heads of the bolts.

It is also preferred that the step of forming the annular projections coaxial with the holes in the annular wall portion comprises press-working the body and simultaneously punching the holes and forming the annular projections.

The invention consists of a novel improvement to the method of manufacturing booster housings for brake systems as shown and described. The accompanying drawings, which are incorporated in and constitute a part of this specification, illustrate one embodiment of the invention and together with the description, serve to explain the principles of the invention.

DETAILED DESCRIPTION OF THE INVENTION

Figure 2:
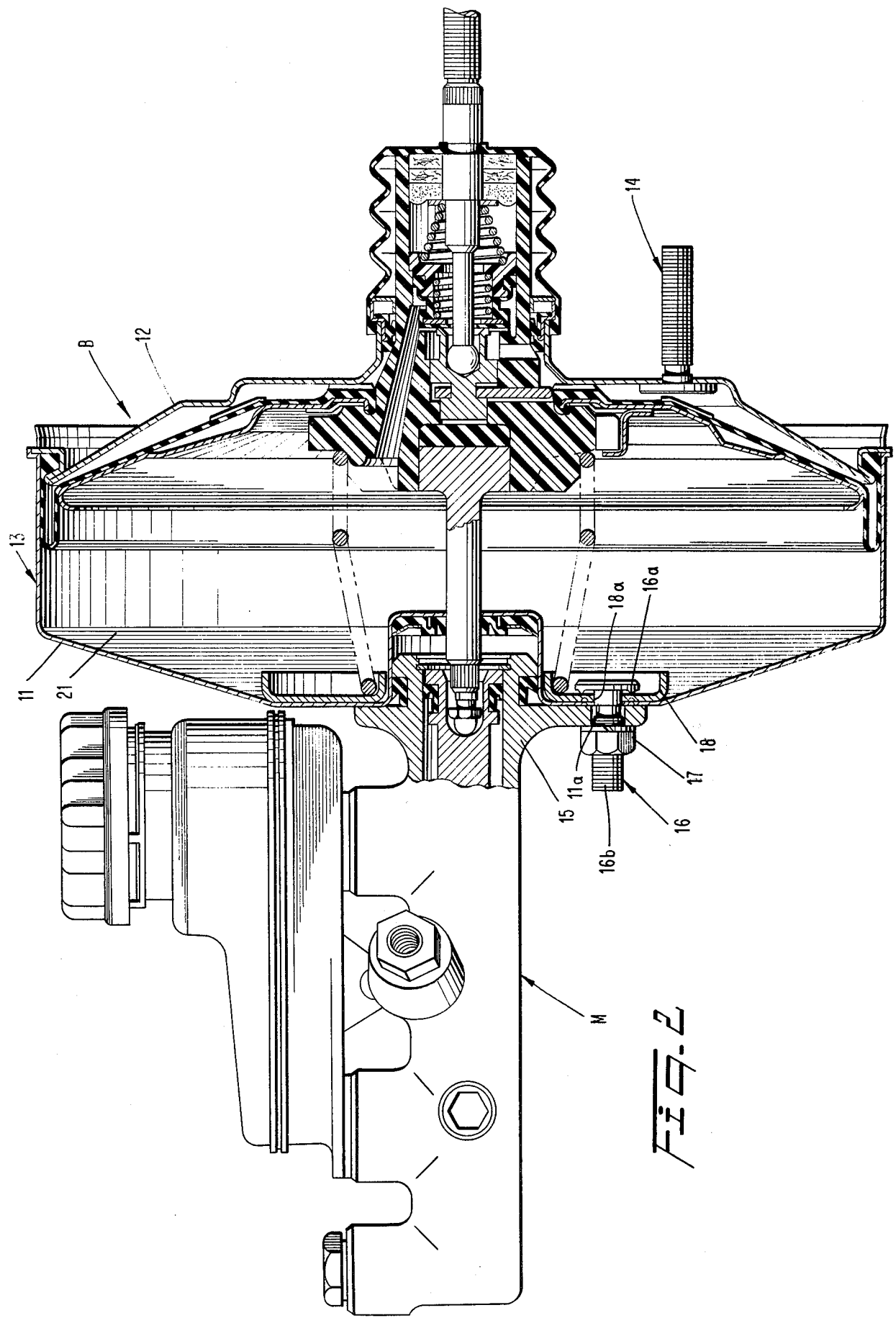
FIG. 2 is a sectional view of a vacuum booster manufactured in accordance with the present invention.

The present invention is directed to a method of manufacturing vacuum booster (FIG. 2) for attachment to a brake master cylinder M. The booster B comprises a housing 13 including a body 11 and a cover 12 cooperating with and secured to the body 11 to form a vacuum chamber. The body 11 is made of sheet metal material and is shaped by press-working to a generally cup-shape. The cover 12 is made of sheet metal material and is shaped by press-working in a generally dish-shape. The booster housing 13 is secured to the vehicle body (not shown) by means of bolts 14 passing through openings in cover 12.

Cylinder body 15 of master cylinder M is secured to an annular wall portion 11c of (FIG. 3) housing 11 by a plurality of bolts 16 disposed in holes 11a in annular wall portion 11c and nuts 17. Each of the bolts 16 includes a head portion 16a disposed inside of housing 13 on a shaft portion 16b passing through openings 11a in the annular wall portion 11c.

An annular reinforcing plate 18 made of metal is disposed between and secured to the inner surface of attachment wall portion 11c and seating surfaces of head portion 16a or bolt 16 so as to disperse the load transmitted from head portions 16a of bolt 16 to the annular wall portion 11c of body 11.

In accordance with the invention, the improved method of manufacturing comprises the step of forming on the seating face of the head of each bolt an annular projection coaxial with the shaft thereof. In the embodiment depicted in FIG. 3, the seating face of the head 16a of each bolt 16 is formed with an annular projection 16c coaxial with the shaft 16b of the bolt 16. Preferably, the annular projection 16c is formed during the step of stamp forging the heads 16a of bolts 16.

Figure 1:
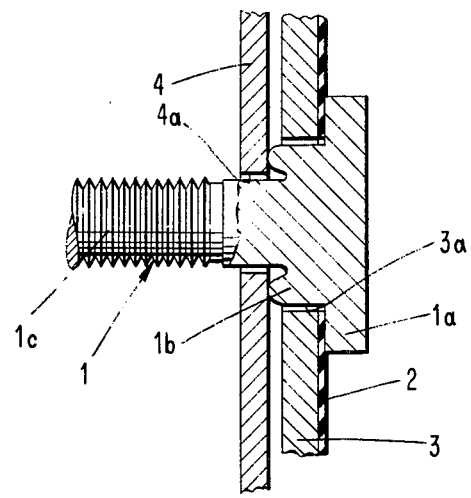
FIG. 1 is a fragmentary sectional view depicting a known method of manufacture.
Figure 3:
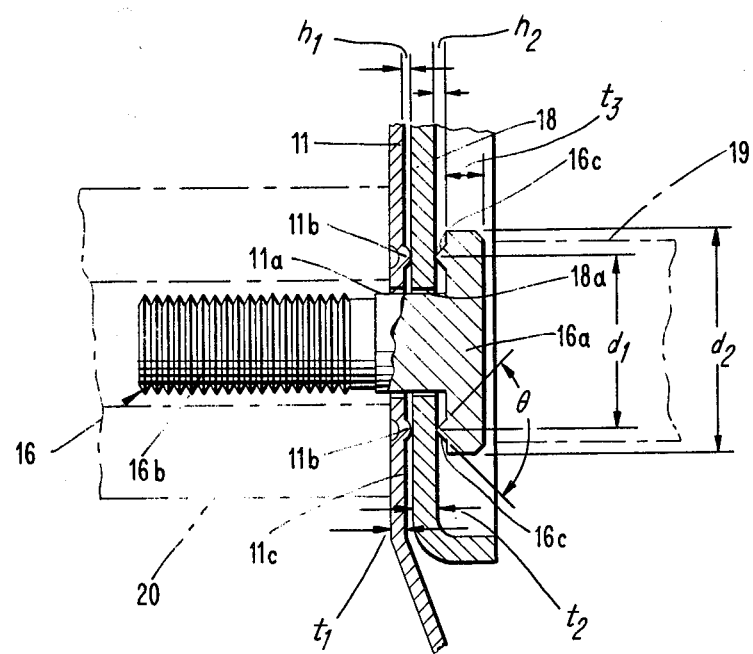
FIG. 3 is a fragmentary sectional view of the components of a vacuum booster for manufacture in accordance with the present invention.

Also in accordance with the invention, annular projections are formed on the inner surface of the annular wall portion, each annular projection being coaxial with a respective one of the holes in the annular wall portion. As depicted in FIG. 3, the inner surface of annular wall portion 11c of body 11 is provided with annular projections 11b, each annular projection 11b being coaxial with the openings 11a in the annular wall portion 11c.

Preferably, the body portion 11 is formed of plate material by press-working and the annular projections 11b are formed at the same time as the openings 11a in annular wall portion 11c are punched.

The method of the invention further comprises the step of placing a reinforcing plate between and in contact with the annular projections on the bolts and on the inner surface of the annular wall portion. As depicted in FIG. 3, reinforcing plate 18 is disposed between head 16a of bolt 16 and annular wall portion 11c of body 11. Reinforcing plate 18 is in contact at one side thereof with annular projections 16c on the seating faces bolt head 16a and is in contact at the other side thereof with annular projections 11b formed on the inner face of annular wall portion 11c.

The invention further comprises a step of simultaneously projection welding the annular wall portion to the reinforcing plate and the reinforcing plate to the heads of the bolts. As may be seen in FIG. 3, a projection welding device is disposed in contact with the head portion 16 and the outside surface of the annular wall portion 11c and a predetermined electrical current is supplied between electrodes 19 and 20 of the projection welding device. After a predetermined period of current passage, annular wall portion 11c is welded to one side of reinforcing plate 18 and the seating face of bolt heads 16a are welded to the other side of reinforcing plate 18. Thus in one projection welding step, bolt head 16a, reinforcing plate 18 and annular wall portion 11c are integrally secured together. Reinforcing plate 18 provides adequate reinforcement of the annular wall portion by distributing the load imposed on bolt head 16a throughout the annular reinforcing plate 18.

Additionally, the one-step welding operation which integrally secures the annular wall portion 11c, reinforcing plate 18 and bolt head 16a, also closes openings 11a in annular wall portion 11c and opening 18a in reinforcing plate 18 without using any other sealing device.

To demonstrate the effectiveness of the method of the invention, the following experiment was conducted. Referring to FIG. 3, body 11 was made of sheet steel of a type denominated as Class 3 (SPCE) as set forth in the Japanese Industrial Standards (JIS G 3141 (1977)). Bolt 16 was made of carbon steel of Class S10C or S15C as set forth in Japanese Industrial Standards (JIS G 4051 (1979)). Reinforcing plate 18 was made of sheet steel in Class 1 (SPCC) a set forth in Japanese Industrial Standards (JIS G 3141 (1977)).

The following dimensions were used in accordance with FIG. 3:

$t_1$ = 1.0 mm
$t_2$ = 2.0 mm
$t_3$ = 3.0 mm
$h_1$ = 0.5 mm
$h_2$ = 0.9 mm
     = 90°
$d_1$ = 14 mm
$d_2$ = 18 mm

Projection welding of the annular wall portion of 11c, reinforcing plate 18 and bolt head 16a was performed within welding current of 66,800 amps for 4 pulses (1 pulse equals 0.33 seconds) with a pressure of 610 kilograms.

The vacuum booster housing constructed in the above described experiment had an effective diameter of 9 inches and was found from testing to be able to withstand two million repeated applications of the 300 kilogram load to the cylinder body of the master cylinder.

The invention provides an improved method of manufacturing a vacuum booster housing providing increased strength and durability while reducing the manufacturing cost. It will be apparent to those skilled in the art, that various modifications and variations can be made to the method of the invention without departing from the scope or spirit of the invention.

What is claimed is:

1. In a method of manufacturing a vacuum booster housing including a body of sheet metal having an annular wall portion, a plurality of bolts disposed in a plurality of spaced holes in said annular wall portion with the heads of said bolts being inside said body and the shafts of said bolts projecting through said holes for securing a brake master cylinder to said booster housing, and an annular reinforcing plate interposed between and in contact with the inner surface of said annular wall portion and the seating faces of the heads of said bolts, the improvement comprising the steps of:

(a) forming on the seating face of the head of each said bolt an annular projection coaxial with the shaft thereof;

(b) forming on the inner surface of said annular wall portion annular projections, each annular projection being coaxial with a respective one of said holes;

(c) placing said reinforcing plate between and in contact with the annular projections on said bolts and on the inner surface of said annular wall portion, and (d) simultaneously projection welding said annular wall portion to said reinforcing plate and said reinforcing plate to the heads of said bolts.

2. The method of claim 1, wherein the step of forming an annular projection on the seating face of each said bolt comprises stamp forging the heads of said bolts.

3. The method of claim 1, wherein the step of forming annular projections coaxial with the holes in said annular wall portion comprises press-working said body and simultaneously punching said holes and forming said annular projections.

* * * * *

UNITED STATES PATENT AND TRADEMARK OFFICE
CERTIFICATE OF CORRECTION

PATENT NO. : 4,409,460
DATED     : October 11, 1983
INVENTOR(S) : M. Nishii et al It is certified that error appears in the above-identified patent and that said Letters Patent is hereby corrected as shown below:

On the title page the following should be added:

--[30]    Foreign Application Priority Data

Dec. 12, 1980  [JP]   Japan ....... 55-176399--.

Signed and Sealed this

Twenty-first Day of February 1984

[SEAL]

Attest:

GERALD J. MOSSINGHOFF

Attesting Officer     Commissioner of Patents and Trademarks